Oct. 31, 1950     C. W. CHAPMAN     2,528,263
INTERNAL-COMBUSTION ENGINE OF
THE COMPRESSION IGNITION TYPE
Filed April 8, 1947                                5 Sheets-Sheet 1
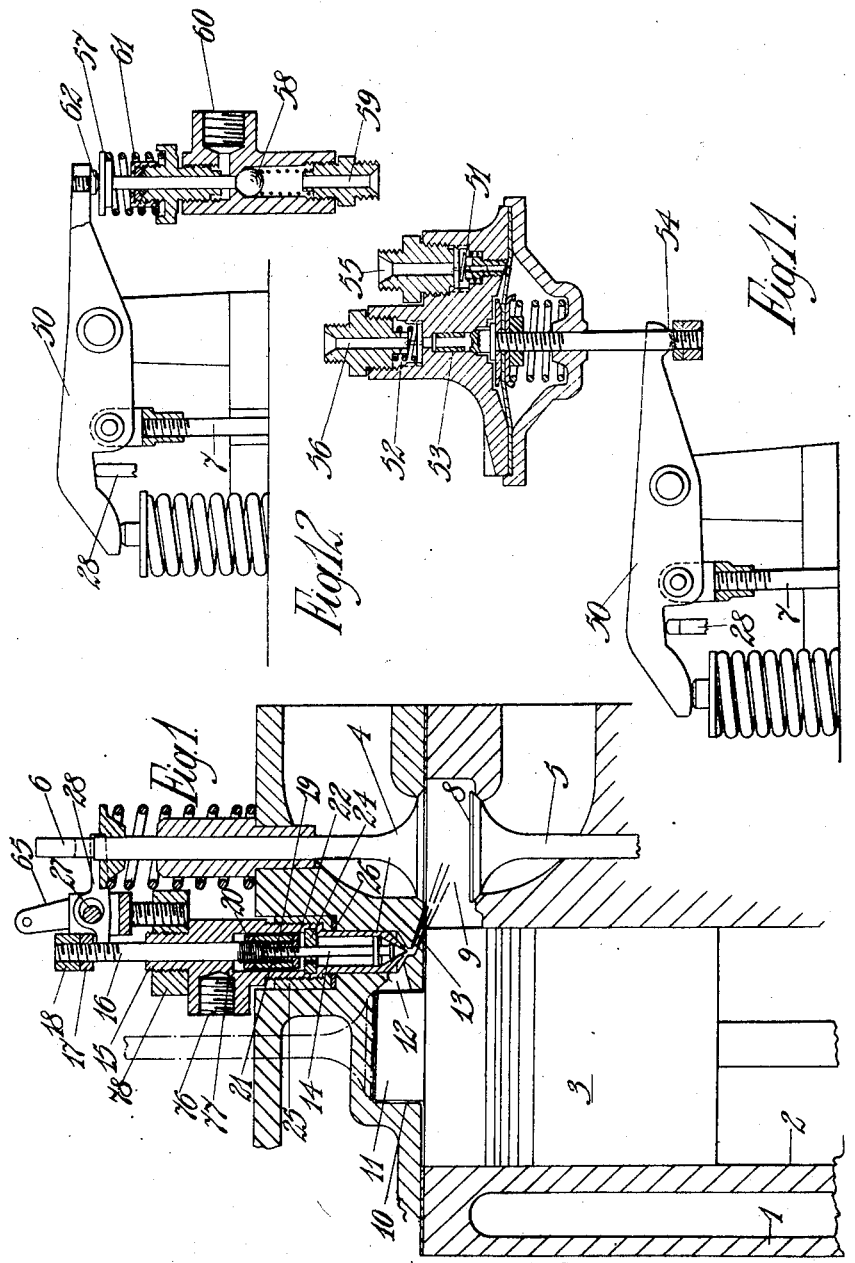
Inventor
C. W. Chapman
By Hascock Downing ReNd
Attys

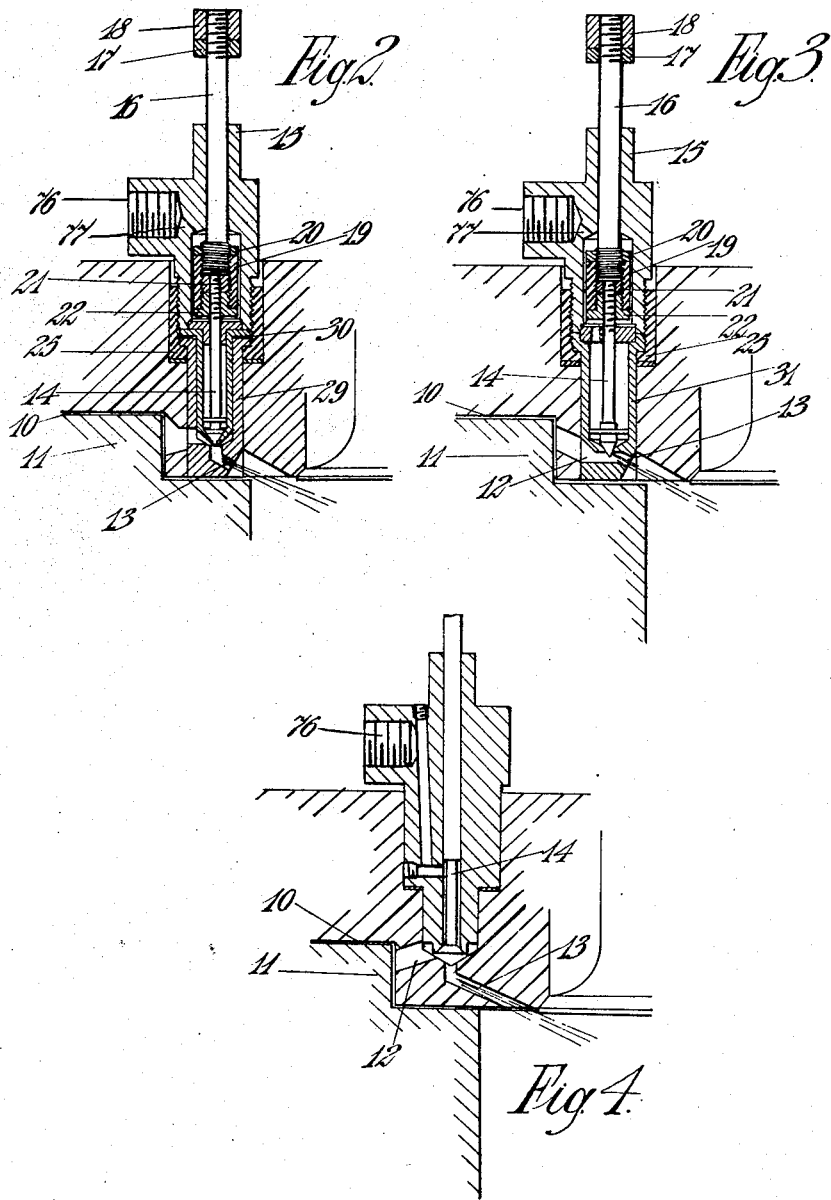

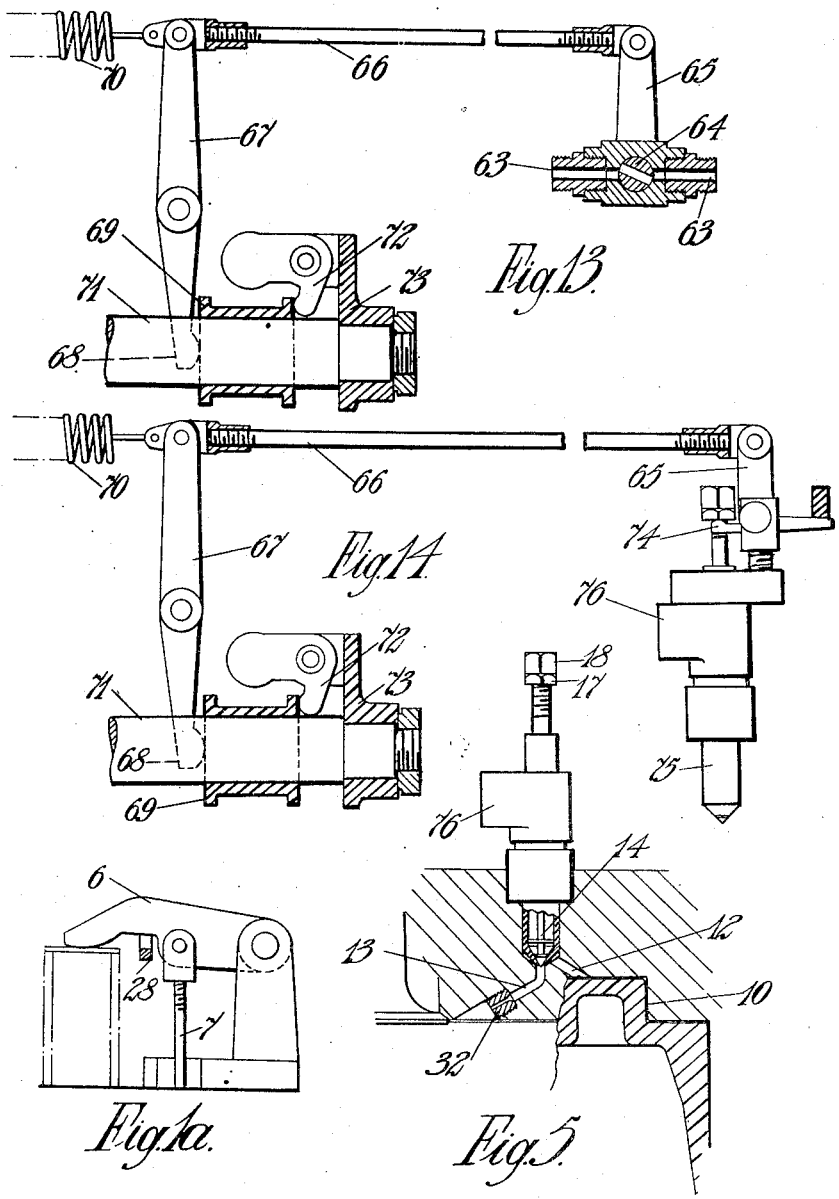

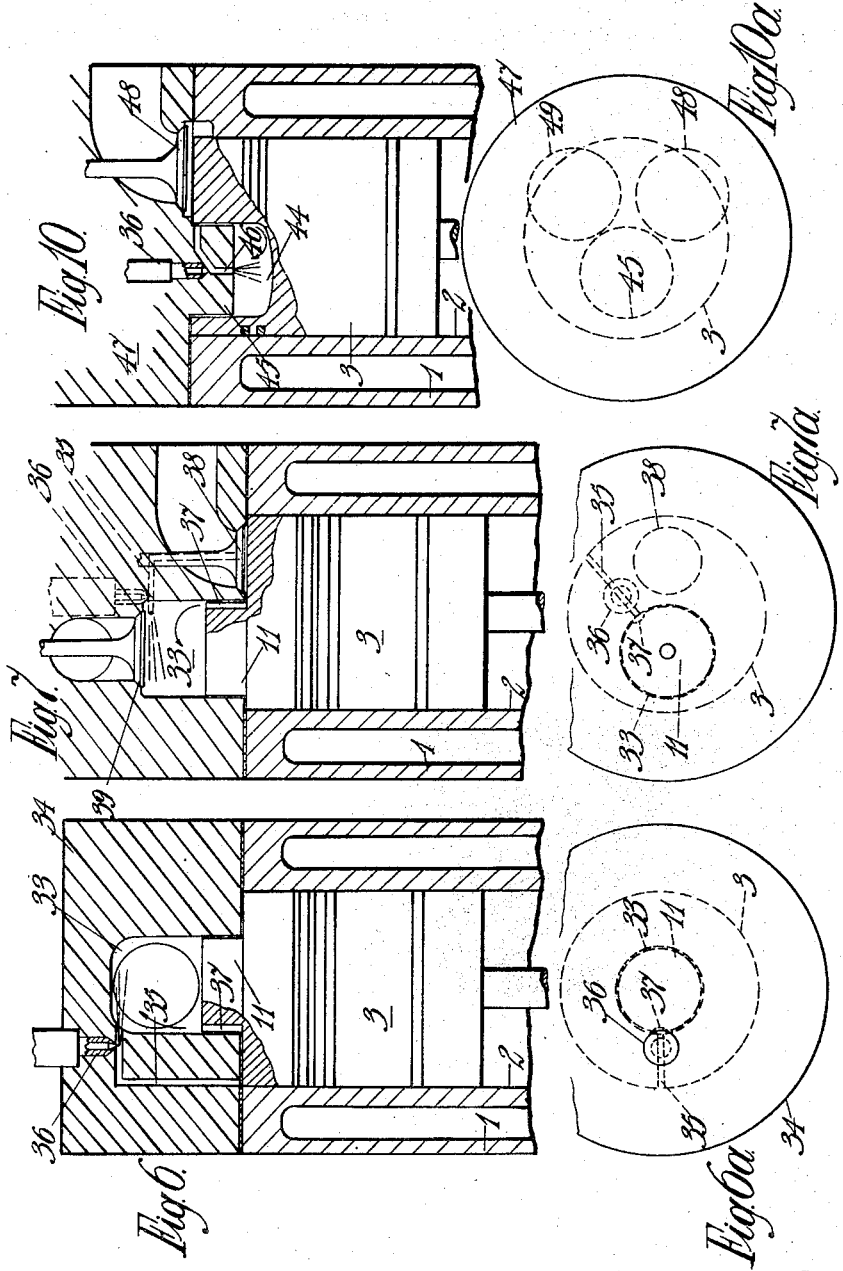

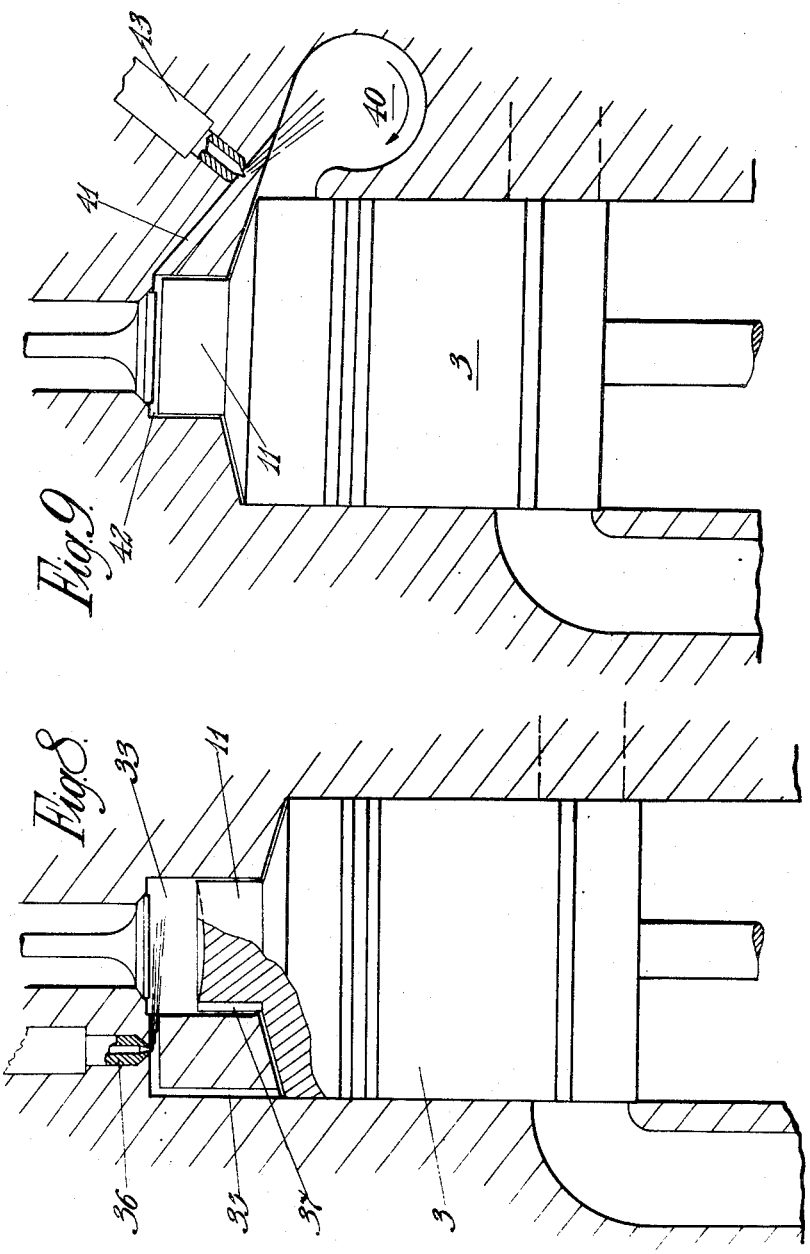

Patented Oct. 31, 1950

2,528,263

UNITED STATES PATENT OFFICE 2,528,263

INTERNAL-COMBUSTION ENGINE OF THE COMPRESSION IGNITION TYPE

Charles Wallace Chapman, Burstow, England

Application April 8, 1947, Serial No. 740,010
In Great Britain April 29, 1946

5 Claims. (Cl. 123—32)

This invention relates to internal combustion engines of the compression ignition type and has for its object to provide a simple yet efficient construction of engine which eliminates the necessity of employing the usual accurate metering high pressure injection equipment, yet enables the general construction of the engine to follow substantially the orthodox lines in the provision of a compression ignition type engine operating on the four- or two-stroke cycle.

The invention accordingly consists in an internal combustion engine of the compression ignition type comprising a cylinder, a piston disposed within said cylinder, a duct system associated with said cylinder, and means for supplying said duct system with fuel, the cylinder clearance space being so constructed and arranged that the piston on approaching top dead centre divides the said clearance space into two sections, one of which forms the actual combustion chamber, whereas the other is appreciably swept by the piston but is in communication with said combustion chamber by said duct system which is supplied with liquid fuel during the suction or scavenging period by gravity or low pressure feeding means, said fuel being retained in said duct system by capillary action until said piston approaches top dead centre, whereby as said piston reaches the end of its stroke air is forced through said duct system in such a way as to carry a supply of fuel into said combustion chamber.

According to the preferred arrangement, the means for supplying the duct system with fuel comprises a fuel valve, which is operatively connected with the engine so as to be momentarily opened during the suction or scavenging period so as to release a supply of fuel, and which is provided with an apertured seating which forms a substantially vertical channel which opens into the duct system which forms a substantially horizontal passage which is transversely arranged with respect to the valve body and serves to interconnect the two sections of the cylinder clearance space, the cross-sectional areas of said vertical channel and said horizontal passage being such that each time the fuel valve is opened the fuel released into said apertured seating is retained within said horizontal passage until it is forced out into said combustion chamber by the air current produced by the piston approaching top dead centre.

The invention will be more completely understood from the following detailed description which is given in conjunction with the accompanying drawings, in which—

Figure 1 is a sectional elevation of part of a compression ignition engine constructed in accordance with the invention and showing the upper part of the cylinder together with the piston, valves and fuel supply mechanism;

Figure 1a shows the rocker lever mechanism for actuating the inlet valve;

Figures 2, 3, 4 and 5 are sectional elevations of modified forms of fuel supply mechanism;

Figures 6, 7, 8, 9 and 10 are sectional elevations of modified forms of combustion chamber together with its associated parts, Figures 6a, 7a and 10a being plan views respectively of part of the arrangements shown in Figures 6, 7 and 10;

Figures 11 and 12 are sectional elevations of modified forms of safety devices for use with the arrangements shown in any of Figures 1 to 10 for preventing fuel entering the cylinder by way of the fuel valve should the latter be open when the engine is stopped;

Figures 13 and 14 are sectional elevations of modified forms of centrifugal governor suitable for use with any of the arrangements shown in Figures 1 to 10 for automatically controlling the fuel supply.

Referring first to Figure 1 of these drawings, the engine is provided with a cylinder block 1 in which the cylinder 2 is formed, the latter containing the piston 3. The inlet valve 4 which is of the conventional mushroom type is disposed either to one side over the side exhaust valve 5, or centrally over the piston 3 as shown in dotted lines. This inlet valve 4 is actuated by a rocker arm 6 which is connected by a link rod 7 to a cam shaft rocker lever in the crank case as shown in Figure 1a. The exhaust valve 5 is located to one side of the cylinder block 1 and the head 8 of this valve forms the bottom wall of the combustion chamber 9 to be hereinafter described. This exhaust valve 5 is operated by a rocker arm from the cam shaft in any conventional manner. The combustion chamber 9 is formed in the cylinder casing near the upper end of the cylinder 2 and forms with the upper part of the cylinder a clearance space which is adapted to be divided by the piston as it approaches top dead centre. The upper end or head of the cylinder 2 is provided with a cylindrical recess 10 which is at top dead centre entirely or substantially occupied by a cylindrical extension 11 formed on the top of the piston 3, but this recess 10 is in open communication with the combustion chamber 9 by means of the ducts 12 and 13. The duct 13 provides a passage for the fuel, the supply of which is controlled by the valve 14. This valve, consists of a main body 15 which forms a guide for the valve operating rod 16 and also acts as a centralising member for the clamp 78. This main body 15 also contains the fuel inlet passages 76 and 77. The operating rod 16 has at its top extremity two nuts 17 and 18, the lower nut 17 being preferably hardened for contacting the rocker arm, and the upper nut 18 being used as a lock nut. At the lower end of rod 16 is a sleeve nut 19 which is locked to the rod by the nut 20.

The screwed end of the valve 14 has a small circular nut 21 attached which fits inside the sleeve nut 19 and is held in position by a gland nut 22. The circular nut 21 has axial and radial clearance when in position ensuring that the valve 14 is concentric with the valve seat 23 without the degree of accuracy needed in machining a one piece centre for a split type valve body. The valve 14 is guided at the top end by a loose piece 24 which is located in the valve seat 23 and at the bottom end by a thin integral band. The guide 24 is drilled and the lower band is flattened to allow passage of fuel oil. The valve seat 23 is held to the main body 15 by a nut 25 the under face of which traps the copper joint 26 against the cylinder head thus providing a gas-tight joint. The tip of the valve seat 23 is cone shaped at a slightly larger included angle than the valve proper, with the object of reducing the area at the fuel outlet to keep the wetted area to a minimum and also, by means of adjusting the thickness of the washer 26, to maintain a fine clearance between the valve seat and the cylinder head in order to obtain maximum air velocity over the valve tip.

The amount of fuel that is allowed to enter the cylinder is controlled by varying the lift of the valve 14 by means of an eccentric 27 which forms the fulcrum pin for the fuel valve rocker arm 28, this rocker arm 28 being so disposed that a portion of the movement of the inlet rocker arm 6 is used to operate it on the suction stroke of the cycle. The fuel valve 14 is spring loaded to retain the valve on its seat against compression pressure and the eccentric fulcrum pin 27 is connected by lever to the governor control bar. With the inlet valve 4 fully open and the governor control bar 65 in the shut down position the pin 27 is adjusted so as to give the lever 28 a small working clearance on the inlet rocker arm 6. This clearance varies as the pin 27 is rotated controlling the lift of the fuel valve 14 by the amount of inlet rocker arm movement utilised.

With this arrangement, as the piston moves upwards into the top dead centre position on the compression stroke of the cycle, it divides the clearance space into two sections, one of which forms the actual combustion chamber 9, while the other is substantially swept by the piston extension 11 but is in communication with the divided combustion space 9 by the ducts 12 and 13 which connect the combustion space with the extension 10 of the cylinder 2. The final clearance of the space swept by the piston extension 11 is thus small as decided by operating conditions, but the other section 9 is of suitable shape and size to contain the bulk of the air required for combustion. This combustion chamber 9 may thus be regarded as a swirl chamber into which air is forced by the piston during its upward movement. Owing to the arrangement of the ducts 12 and 13, however, which connect the two sections of the clearance space together after the piston has divided the two sections and during the remainder of its stroke, air under compression is forced at high velocity through the ducts 12 and 13 from the recess 10 into the combustion space 9 until the piston reaches the end of its stroke when the recess 10 will be substantially filled by the extension 11 of the piston. Meanwhile, liquid fuel has been delivered during the previous suction or scavenging stroke by gravity from the fuel valve 14 into the duct 13 where it is retained by capillary action so that as the air is forced through the ducts 12 and 13 by the movement of the piston, fuel is entrained by the movement of air through the duct 13 and is carried into the combustion space 9 where it is thoroughly mixed and ignited by the hot compressed air therein.

The arrangement is such that the fuel valve 14 is open during part of the suction stroke in the case of an engine operating on the four-stroke cycle or during the scavenging period in the case of an engine operating on the two-stroke cycle. The valve may be arranged to be opened automatically by the difference of pressure inside the cylinder and in the fuel system, or it may be arranged to be mechanically actuated by the engine. When the valve is in the open position it permits a small quantity of fuel to spill into the communicating duct 13.

The point at which the fuel meets the high velocity air in the duct system and the time of firing may be controlled according to the length of the piston extension 11 which will decide the point in the stroke when the clearance space is divided and also the commencement of the transfer of the high velocity air and of the fuel entrained therewith. The rate of fuel supply to the chamber 9 can be controlled by varying the clearance of the extension 11 in the recess 10 and the proportions of the duct systems 12 and 13. The amount of fuel admitted per cycle can be controlled by suitably limiting the lift and/or period of opening of the fuel valve, this being effected either by manual control or by a governor as will be hereinafter described.

Referring now to Figure 2, a modified form of fuel valve is shown which is similar to that shown in Figure 1 but has an extra sleeve 29 enabling the clearance between the end of the valve seat 23 and the sleeve 29 to be adjusted and locked by the shims 30, thus dispensing with the need for a fine tolerance on the copper joint 26. A further difference between the arrangement of Figure 2 and that shown in Figure 1 is that the air and air fuel holes are formed in the sleeve 29 enabling them to be cleaned without having to remove the cylinder head.

In Figure 3 a further modified form of fuel valve is shown which uses the same components as that shown in Figure 1, with the exception of the valve seat 31. This is of the straight through drilled type and may have a cone-shaped entrance to promote air velocity. The valve is easily cleaned and does not rely on fine clearances for its operation.

In Figure 4 an inward opening type valve is shown applied to an engine of the kind illustrated in Figure 1, the space at the lower end of the valve which is fed with fuel when the valve is opened being connected to the clearance space of the engine by the ducts 12 and 13.

In Figure 5 a modified form of outwardly opening valve is shown, but in this case the valve is moved closer to the centre of the cylinder thus allowing a screwed jet 32 to be fitted to the air fuel passage 13. The constructional details of this valve are similar to those illustrated in any one of Figures 1, 2, 3 or 4.

In the modification shown in Figures 6 and 6a, a clerestory type combustion chamber 33 is provided having inlet and exhaust valves arranged horizontally opposite one another. In this case the combustion chamber 33 is disposed in a recess in the cylinder head 34 immediately above the extension 11 of the piston 3, and this combustion chamber is connected to the cylinder 2 by a duct 35 into which the fuel is discharged from the fuel valve 36. In addition a small vertical groove 37 is provided on the fuel side of the piston extension 11 which helps to promote a swirl as the piston rises to the top of its stroke.

In the modification shown in Figures 7 and 7a, an arrangement similar to that of Figures 6 and 6a, is shown, but the piston extension 11 is offset to allow one or both of the valves 38 or 39 to be placed in the bottom face of the cylinder head within the effective diameter of the piston.

Figure 8 shows the system employed in Figure 6 applied to a two-stroke engine with ported induction using crank case compression or pressure charging. The exhaust may be of the poppet type as shown or it may be ported in the cylinder wall as shown in dotted lines. The combustion chamber 33 is disposed in a recess in the cylinder head above the piston extension 11 as in the case of Figure 6, the combustion chamber being connected to the cylinder by the duct 35 which is supplied with fuel from the valve 36. A groove 37 is provided in the fuel side of the piston extension 11 to assist swirl as before.

In Figure 9 a modification of the arrangement illustrated in Figure 8 is shown, but in this case a spherical combustion chamber 40 is provided to one side of the cylinder. This combustion chamber 40 is connected to the recess 42 in the upper end of the cylinder by the duct 41 to which fuel is supplied by the valve 43 which may be mounted in an inclined position as shown.

In the modification shown in Figures 10 and 10a, the piston 3 is provided with a recess 44 instead of an extension, and the head of the cylinder is provided with an extension 45 which fits into this recess 44 when the piston rises to the top of its stroke. In this case the recess 44 in the piston forms the combustion chamber which is connected to the cylinder by the duct 46 which is supplied with fuel from the valve 36, the duct 46 leading to the combustion chamber through the extension 45 of the cylinder head 47. The arrangement is shown as applied to a four-stroke engine having two valves 48 and 49 as shown, but it is to be understood that the arrangement can be equally well applied to a two-stroke engine if desired.

In Figure 11, a constant pressure diaphragm pump is shown suitable for use with any of the engine arrangements shown in Figures 1 to 10, this diaphragm pump being worked from the inlet valve rocker 50. In addition to the normal suction and delivery valves 51 and 52, the pump is provided with a shut-off valve 53 disposed between the two other valves as shown. The object of this safety valve 53 is to prevent fuel entering the cylinder should the engine be stopped with the throttle open and the inlet valve (and consequently the fuel valve) open. The pump is so arranged that the shut-off valve 53 does not leave its seat until the fuel valve is closed. This is controlled by having a small overlap or clearance 54 on the inlet rocker 50 after leaving the fuel valve rocker before contacting the pump plunger. Fuel is fed from a filter through the duct 55 to the suction valve 51 and is supplied through the shut-off valve 53 and delivery valve 52 to the duct 56 leading to the fuel valve.

In Figure 12 a somewhat similar arrangement is shown but the fuel valve is arranged for gravity feed. A similar form of safety device is provided by the shut-off valve 58. A spring-loaded ball valve 58 is incorporated in the fuel line arranged to pass fuel from the inlet duct 59 to the duct 60 leading to the fuel valve, only when the latter is closed. This is effected in much the same way as in the arrangement shown in Figure 11, the inlet rocker 50 and rod 62 being clear of the ball valve 58 until the fuel valve is closed. A light return spring 61 is fitted to keep the rocker arm 50 and push rod 62 in constant contact and to overcome gland friction.

In Figure 13 a centrifugal weight type governor is shown which may be employed in conjunction with any of the arrangements shown in Figures 1 to 12 for operating a fuel cut-off device suitable for incorporation in the fuel valve. In this figure the unions 63 represent the fuel line connecting the fuel supply from the fuel pump or tank to the fuel valve. This supply is controlled by the rotatable valve 64 mounted on the end of the arm 65 pivoted to the link 66 which is pivoted to the lever 67. The tail 68 of the latter is held against the member 69 by the spring 70, this member 69 being slidably mounted on the shaft 71 and being controlled by the bell crank lever 72 which forms part of the governor 73, so that when the latter is rotated above a predetermined speed, the lever 72 swings over forcing the member 69 back along the shaft 71, thereby swinging the lever 67 in a clockwise direction so as to rotate the valve 64 and close the fuel line 63 so as to cut off the supply of fuel.

In Figure 14, a similar arrangement is shown but in this case the governor bar 65 is directly coupled to an eccentric lever 74 which is adapted to control the engine by varying the lift of the fuel valve 75 in the manner already explained in connection with Figure 1.

I claim:

1. A internal combustion engine of the compression ignition type including a cylinder, a piston therein, a cylinder head, a duct system in said head, means including said cylinder defining a clearance space divided into two sections by the piston approaching top dead center, one of said sections constituting the actual combustion chamber, the other of said sections being appreciably swept by said piston, the duct system in said head including means providing communication between said other section and said combustion chamber, fuel feed valve means carried by said head and including an apertured plug extending within the duct system intermediate said sections, a valve within the plug, said plug including a longitudinal passage through which fuel flows, and means defining a valve seat, said valve normally closing said passage and operable on the suction stroke to permit fuel feeding, and the plug further including an additional passage in communication with and constituting part of said duct system and in communication with longitudinal passage and affording a passage for the air compressed by said piston in said other section of said cylinder so that the same may be forced into the combustion chamber, with the fuel fed on the suction stroke being retained in said additional passage in the plug by capillary action and entrained by the compressed air and injected into the combustion space.

2. An internal combustion engine as defined in and by claim 1 in which said additional passage in said plug includes a portion that is horizontally disposed and transverse to said longitudinal passage.

3. An internal combustion engine as defined in and by claim 2 in which said horizontal portion is provided with a cone shaped entrance to promote air velocity past said valve.

4. An internal combustion engine as defined in and by claim 1 in which said duct system includes a pair of oppositely inclined passages leading respectively from the said two clearance space sections toward one another, an enlarged passage section defining the junction of said two inclined passages and said apertured plug being disposed in said enlarged section.

5. An internal combustion engine as defined in and by claim 1 in which a sleeve is mounted within said plug, said sleeve being longitudinally adjustable relative to said other passage, said sleeve incorporating means defining the valve seat, and the adjustment of said sleeve relative to said other passage determining the clearance between the valve seat and the walls of said other passage so as to obtain maximum air velocity past the valve tip.

CHARLES WALLACE CHAPMAN.

REFERENCES CITED

The following references are of record in the file of this patent:

UNITED STATES PATENTS

| Number | Name | Date |
|---|---|---|
| 2,121,813 | Mitchell | June 28, 1938 |

FOREIGN PATENTS

| Number | Country | Date |
|---|---|---|
| 593,837 | France | June 6, 1925 |
| 725,764 | France | May 18, 1932 |
| 777,738 | France | Feb. 27, 1935 |
| 650,570 | Germany | Sept. 25, 1937 |